United States Patent [19]

Juppet et al.

[11] 4,327,873
[45] May 4, 1982

[54] APPARATUS FOR REGULATING THE SPEED OF A MEMBER DELIVERING OR WINDING A YARN

[75] Inventors: Paul Juppet; Robert Konopatsky, both of Lyons, France

[73] Assignee: Rhone-Poulenc Textile, Paris, France

[21] Appl. No.: 46,386

[22] Filed: Jun. 7, 1979

[30] Foreign Application Priority Data

Jun. 7, 1978 [FR] France .................. 78 17252

[51] Int. Cl.³ ............................................ B65H 59/38
[52] U.S. Cl. ...................................... 242/45; 226/24; 310/93
[58] Field of Search ...................... 242/45, 75.5, 75.51; 226/24, 42, 44, 10; 310/92, 93, 98, 104, 105, 106, 107

[56] References Cited

U.S. PATENT DOCUMENTS

| | | | |
|---|---|---|---|
| 1,212,692 | 1/1917 | Ruckgaber | 310/93 X |
| 2,608,355 | 8/1952 | Bell et al. | 242/45 |
| 2,741,437 | 4/1956 | Haworth | 242/45 |
| 3,113,746 | 12/1963 | Steen | 242/155 M |
| 3,534,922 | 10/1970 | Keith et al. | 242/157 R |
| 3,860,186 | 1/1975 | Schiltknecht et al. | 242/45 |

FOREIGN PATENT DOCUMENTS

| | | | |
|---|---|---|---|
| 534277 | 9/1931 | Fed. Rep. of Germany | |
| 2139420 | 2/1973 | Fed. Rep. of Germany | |
| 2814281 | 10/1978 | Fed. Rep. of Germany | 242/45 |
| 1497243 | 8/1967 | France | |
| 1516689 | 1/1968 | France | |
| 422955 | 1/1935 | United Kingdom | 310/93 |
| 589529 | 6/1947 | United Kingdom | 242/45 |
| 1088513 | 10/1967 | United Kingdom | 242/45 |
| 1090865 | 11/1967 | United Kingdom | |
| 178712 | 4/1966 | U.S.S.R. | |

*Primary Examiner*—Stanley N. Gilreath
*Attorney, Agent, or Firm*—Sherman & Shalloway

[57] ABSTRACT

The yarn is formed into a loop and a loop sensor monitors the variations in length in the loop of yarn. The variations in the size of the loop result from a difference in the speed between the speed of the yarn and the speed of the draw-off or delivery member. The draw-off or delivery member is driven by an asynchronous motor having a slip-clutch drive with an assembly for braking in response to eddy currents. In particular, a disc is connected to the motor and a magnetic field is applied to the disc, the magnitude of the field which is applied to the disc directly dependent upon the size of the loop. In the preferred embodiment, the regulation of the speed of a pilot roller of a winder as a function of the delivery speed of the yarn is accomplished.

11 Claims, 5 Drawing Figures

APPARATUS FOR REGULATING THE SPEED OF A MEMBER DELIVERING OR WINDING A YARN

BACKGROUND OF THE INVENTION

1. Field of the Invention

The present invention generally relates to an apparatus for regulating the speed of a member for delivering or winding yarn as a function of the draw-off speed or the delivery speed of the yarn. In particular, the invention relates to an apparatus for regulating the speed of a winding device with a pilot roller, for textile yarns, as a function of the positive delivery speed of the yarn.

2. Description of the Prior Art

The textile industry commonly uses winding devices (winders) comprising a pilot roller which is in tangential contact with a take-up roll, the function of which is to fix the peripheral speed of rotation of the take-up roll while providing all or part of the coupling required to drive the take-up roll. In general, since the winding speed must remain constant throughout the process for forming the take-up roll, the pilot roller is driven at a constant nominal speed, for example, by means of an electric motor. However, if the yarn is delivered to the winder by a positive delivery device, it is necessary to adapt the winding speed of the take-up roll to the unwinding speed of the positive delivery device at all times. The winding speed must follow the possible fluctuations (which may or may not be accidental) in the delivery speed in order to take up, at all times, the exact amount of yarn delivered, and in order to avoid the risk of breakages, non-uniform tensions and the like.

According to British Pat. No. 1,090,865, a device for regulating the speed of a pilot roller as a function of the delivery speed of a positively delivered yarn is known. The pilot roll is driven by a motor via a friction clutch which permits slipping. The speed given to the pilot roller is greater than the delivery speed of the yarn and it is adapted and regulated as a function of the delivery speed by means of a braking device which acts, by friction, directly on the pilot roller. The braking device is governed by a pneumatic pressure system controlled by a lever detecting a loop of yarn of which the length can vary as a function of the delivery speed. It is a device which employs both mechanical means and pneumatic means and is complex.

French Pat. No. 1,497,243 discloses a device for adjusting the winding tension in a yarn by controlling the winding speed in which the take-up bobbin is axially driven via an electromagnetic clutch-and-brake assembly. The variation in the braking and driving forces is achieved by varying the excitation current in the electromagnets, using an electronic circuit, by means of a potentiometer controlled by a pivoting arm which acts as a loop sensor, the position of which arm depends on the tension in the yarn.

Simpler means are also known which function in accordance with the principle of braking by means of eddy (Foucault) currents for controlling the tension in a yarn between delivery means and a draw-off device.

Thus, according to Published Application DT-OS (German Published Specification) No. 2,139,420, in order to maintain constant tension between a delivery roll and a winding roller, the delivery roll is integral with a brake operating by means of eddy (Foucault) currents. However, this device does not permit the automatic regulation of the delivery speed to match the draw-off speed.

Russian Pat. No. 178,712, describes a device for the automatic regulation of the tension in a yarn which is drawn off by a fixed take-up roll. The yarn is delivered by a roller which is caused to rotate directly by the yarn, the yarn itself being pulled downstream. The delivery roller is integral with a braking disc operating by means of eddy (Foucault) currents. The effect of the disc can vary by pushing it to a greater or lesser extent into the gap of a fixed magnet. The variations in tension are recorded by a lever provided with a guide over which the yarn passes, the prestressed lever giving the nominal tension. The lever is mechanically connected to the device and governs its displacement in the gap of the magnet, thus varying the braking of the delivery roller. This patent describes the use of braking by means of eddy (Foucault) currents for the regulation of an unwinding tension. However, it does not relate to the regulation of the speed of positive delivery means or of winding means as a function of the draw-off speed or delivery speed of the yarn.

German Pat. No. 534,277 describes a winding device comprising a braking assembly operating by means of eddy (Foucault) currents. The effects of the eddy currents can be varied, as a function of the tension in the yarn, by means of a sensor. The breaking assembly acts on a spindle which is mounted on an idler and is rotated by a yarn which is driven by a lug coaxial with the spindle. Like the preceding patent, this patent does not apply to the regulation of the speed of a positively driven member.

SUMMARY OF THE INVENTION

It is an object of this invention to describe a device for delivering yarns which is simple and reliable and employs low inertia.

It is a further object of this device to describe a yarn delivery system which is sensitive and reacts immediately to any variation in speed thereby permitting corrections of which the amplitude can be of the order of 20% or above relative to the nominal value which can range from 100 meters per minute to 6000 to 7000 meters per minute and above.

It is a further object of this invention to describe a yarn delivery system having a low cost and particularly suitable for the simple winding equipment used in low speed or medium speed windings employing yarn speeds of less than 1000 meters per minute.

It is another object of this invention to describe a yarn delivery system which is suitable in an installation which comprises a large number of winding heads and requires a large number of regulating devices.

The present invention proposes new means, which are simple and reliable, for regulating the draw-off speed of a yarn as a function of the delivery speed, and visa versa.

The invention relates to a device for regulating a member for delivering or drawing off yarn, as a function of the draw-off speed of delivery speed of the yarn. A loop sensor monitors the variations in the length of a loop formed from the yarn. The variations result from a difference between the speed of the yarn and that of the delivery or draw-off member. The system comprises a slip-clutch drive for the draw-off or delivery member. The drive is equipped with an assembly for braking by means of eddy (Foucault) currents, the assembly comprising at least one magnet and at least one braking element made of antimagnetic metal integral in rotation with the output shaft of the drive and permanently located, at least in part, in the field of the magnet. The assembly further includes means for varying the magnitude of the magnetic field passing through the braking element as a function of the length of the loop of yarn, the means for varying being connected to the loop sensor.

The eddy (Foucault) currents, permanently generated by the rotation of the braking element in the magnetic field, cause a braking couple on the output shaft of the clutch drive. The slip-clutch drive assumes a speed which is a function of the load, i.e., a function of the value of the braking couple applied. A difference in speed between the yarn and the draw-off or delivery member is monitored by the loop sensor which then governs the means for varying the magnitude of the field passing through the braking element. This results in a change in the magnitude of the braking couple and a correction of the speed of the output shaft of the slip-clutch drive.

The slipping-clutch drive can be in various forms such as an asynchronous electric motor or a liquid or gas turbine. Alternatively, the slip-clutch may consist of a constant-speed electric motor connected to a magnetic or hydraulic slipping clutch, a transmission shaft which is common to several draw-off or delivery members and a hydraulic or magnetic clutch for each draw-off or delivery member. Preferably, one asynchronous electric motor is used per draw-off or delivery member.

The loop sensor is of any known type, namely mechanical, pneumatic or the like. For simplicity, a mechanical sensor is used.

The magnet of the braking assembly is preferably a permanent magnet, but it can be an electromagnet if high powers are employed or if it is not possible to house a braking element of sufficient diameter to produce the desired braking effect.

The braking element can be a disc or it can be in any suitable form, for example in the form of a bell, a cylinder or the like. The dimensions of the braking element and, particularly, the diameter are a function of the desired magnitude of the braking couple, taking into account the space available for its housing.

Part of the braking element is located in the magnetic field of the magnet. In the case of a disc and a horseshoe magnet, part of the disc will be permanently located in the gap of the magnet.

The means for varying the field, which are governed by the loop sensor, can be purely mechanical or can employ an electrical or electronic circuit, or can also combine mechanical means with electrical or electronic means. The control will be adapted to the type of means used for varying the field and to the type of sensor used; it will be either mechanical, or electronic or electrical, or even pneumatic.

In the embodiment where the magnet is a permanent magnet, the magnet comprises a movable part of which the displacement varies the field passing through the braking element. The movable part can be the entire magnet or only the pole portions.

In either embodiment, the displacement of the movable part acts by varying the overlap zone between the braking element and the poles or the pole portions of the magnet, i.e., by varying the surface of the braking element located in the magnet field. Alternatively, the movable part may be a magnetic shunt, such as a piece of metal interposed in the gap outside the overlap zone between the braking element and the magnet. In this alternative embodiment the shunt deflects part of the field outside the braking element, the deflected part of the magnetic field varying as a function of the displacements of the shunt, the magnet and the pole portions remaining fixed. The magnet, the pole portions and the shunt can move translationally, rotationally or in accordance with a combination of these movements.

In the above embodiments, a mechanical loop sensor is used and the displacement of the movable part of the magnet is advantageously caused directly by the movements of the sensor, the control consisting of a mechanical linkage. The mechanical linkage between the sensor and the movable part of the magnet can be produced by any known means, depending on the particular case, namely by levers, connecting rods, a system of rods, cables, gears, cams and by combinations of these means. In the embodiment where the magnet is an electromagnet, the variation in the field passing through the braking element is advantageously achieved by varying the excitation current. If a mechanical sensor is used, the variation in the current can be achieved, for example, by means of any suitable electronic circuit from a transducer governed by the sensor.

The invention applies in particular to the regulation of the speed of a pilot roller of a winder with peripheral drive, for textile yarn, as a function of the delivery speed of the yarn.

BRIEF DESCRIPTION OF THE DRAWINGS

The invention will be more clearly understood with the aid of the specification and the figures below, which are given by way of illustration but without implying a limitation. The embodiment illustrated relates to a device for winding textile yarns wherein.

DETAILED DESCRIPTION OF THE INVENTION

Figure 1:
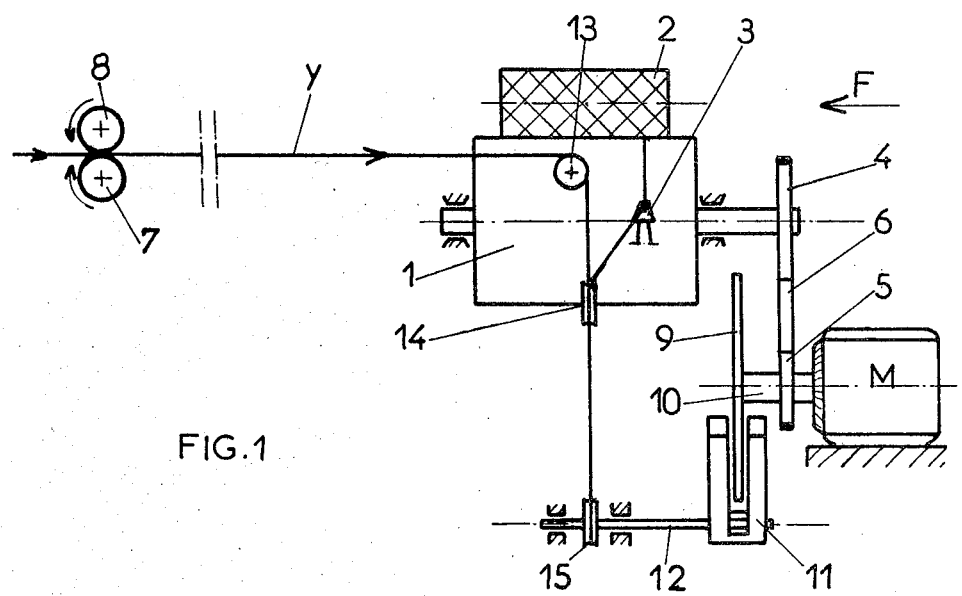
FIG. 1 is a front view of the embodiment according to the invention.
Figure 2:
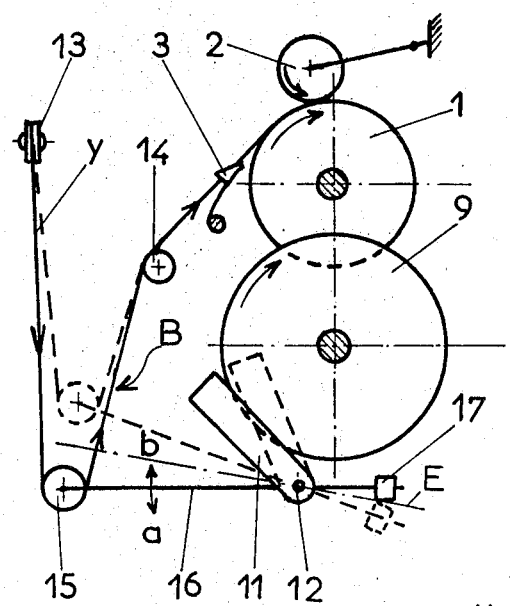
FIG. 2 is a simplified view along arrow F of FIG. 1.

The winding device, of conventional type, comprises a pilot roller 1 which drives a take-up roll 2 by friction, determining its peripheral speed, and comprises a reciprocating guide 3 for dispensing the yarn in a reciprocal manner along the take-up roll. The pilot roller 1 is rotated by an asynchronous electric motor M (and optionally a step-down unit which is not shown) by means of pulleys 4 and 5 and a belt 6 (the assembly only being seen in FIG. 1). The yarn Y is positively fed from a source, which is not shown, by means of a pair of delivery rollers 7 and 8. An antimagnetic metal disc 9 is integral with the shaft 10 of the motor M and rotates between the poles of permanent magnet 11 which is integral with rotating axle 12. By pivoting, the magnet is capable of overlapping the surface of the disc 9 to a greater or lesser extent. The disc 9 penetrates into the gap of the magnet to a greater or lesser extent thus causing a variation in the magnetic field passing through the disc 9 (see phantom lines of FIG. 2).

The yarn, originating from the pair of delivery rollers 7 and 8, is guided over idler wheels 13, 14 and 15, describing a loop B around the wheel 15, directed by the reciprocating guide 3 and wound to form a take-up roll 2. The wheels 13 and 14 are fixed and the wheel 14 can also act as a triangulation guide; the wheel 15 is mounted at one end of the pivoting arm 16. The other end of the arm carries a counter-balancing weight in the form of a sliding mass 17 which is intended partially to compensate the weight of the arm 16 and of the wheel 15, and makes it possible to adjust the tension applied to the yarn via the wheel 15. The arm 16 is integral with the axle 12 and pivots together with the axle 12. Thus, via the axle 12, the arm 16 and the magnet 11 are integral in rotation.

MODE OF OPERATION OF THE INVENTION

Figure 3:
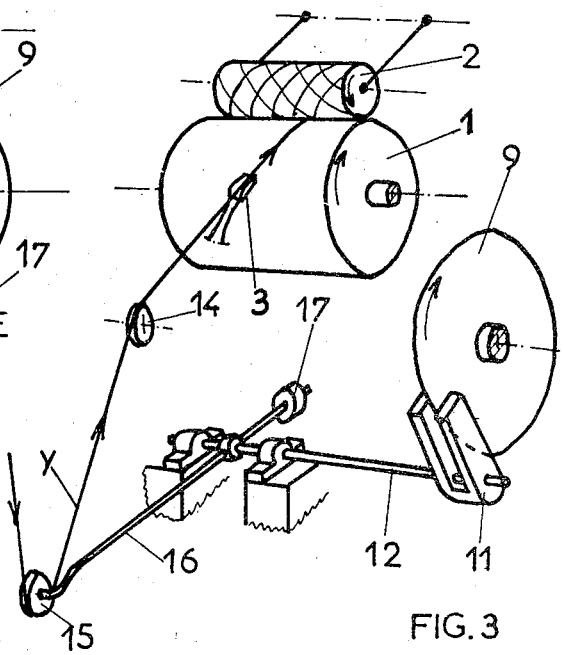
FIG. 3 is a partial view, in perspecitve, of the embodiment according to FIG. 1.

The characteristics of the motor M, and also of its means of connection with the pilot roller, are determined in such a way that, in the absence of any braking, the pilot roll 1 is driven at a speed $V_1$ which is slightly greater than the nominal delivery speed V of the yarn. With the yarn in place, the mass 17 is positioned so as to apply a predetermined tension to the yarn. With the yarn being drawn off at a speed $V_1$ which is greater than V, the loop B tends to decrease in length, carrying the wheel 15 upwards and causing the arm 16 and the magnet 11 to pivot. The poles of the magnet 11 then enclose the disc 9, producing eddy (Foucault) currents which cause the braking of the disc 9 and hence the motor M and consequently the pilot roller 1. An equilibrium is established between the two speeds. If the delivery speed increases, the loop B extends and the arm 16 pivots in the direction of the arrow a (FIGS. 2 and 3) and carries the magnet 11 downwards. As a result, the overlap zone i.e., poles of the magnet/disc, decreases, the field passing through the disc 9 decreases, and this produces a decrease in the braking force and an increase in the speed of the motor and of the pilot roller 1. If the delivery speed decreases, the loop B shortens, which causes the arm 16 and the magnet 11 to pivot in the direction of the arrow b. As a result, the overlap zone, namely poles of the magnet/disc, increases, the braking couple increases and the speed of the motor and of the pilot roller 1 decreases. Thus, in accordance with the variations in V, the arm 16 and the magnet 11 oscillate about an equilibrium position E between two extreme positions respectively shown in broken lines and solid lines in FIG. 2.

In the embodiment illustrated, the device can be adjusted by altering the angular setting of the magnet 11 on the axle 12, by varying the gap, employing magnets 11 of different strengths and different shapes, and so on.

When employing a magnetic shunt, adjustment can also be carried out by varying the gap, by employing magnets of different strengths and also by altering the pattern of the shunt movement.

The above construction can of course comprise modified embodiments. For example, the pilot roller 1 and its drive motor may consist of a single member in the form of a motor-drum. The asynchronous electric motor can be replaced by a gas turbine, a hydraulic turbine or by a constant-speed electric motor coupled to a slip-clutch as has already been pointed out. The linkage between the pivoting arm 16 and the magnet, or the shunt, can be indirect, via levers, connecting rods, gears, cables or the like.

In the case of high speeds and/or fine yarns, the wheel 15 is advantageously replaced by a pneumatic yarn guide of the type described in French Pat. No. 1,516,689 or U.S. Pat. No. 3,534,922; this pneumatic guide, which is also mounted at the end of the arm 16, makes it possible to avoid the variations in tension which can be created by the wheel.

However, the invention is not restricted to the disclosed embodiment. As has been mentioned, it also applies to the regulation of the delivery speed of a yarn relative to its draw-off speed. It is further contemplated that the draw-off member may be a yarn-treating device subjected to speed variations.

The device according to the invention can be applied to the regulation of members for drawing off or delivering yarns, in particular, textile yarns of all gauges and all types, it being possible for the yarns to move at speeds of the order of 6,000 to 7,000 meters/minute and above.

Figure 4:
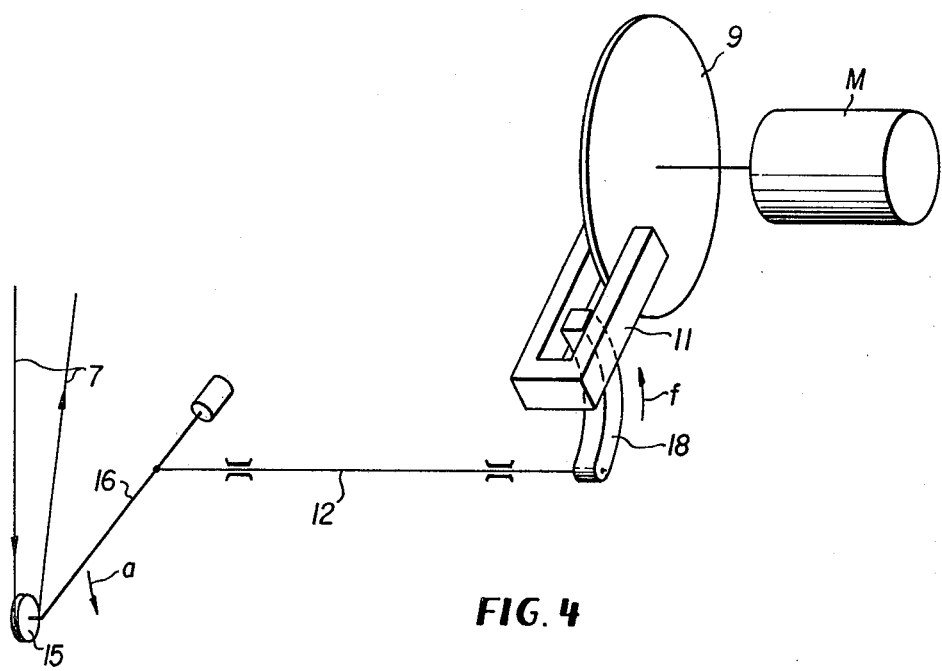
FIG. 4 is a partial view, in perspective, of a modification of the invention using a magnetic shunt.
Figure 5:
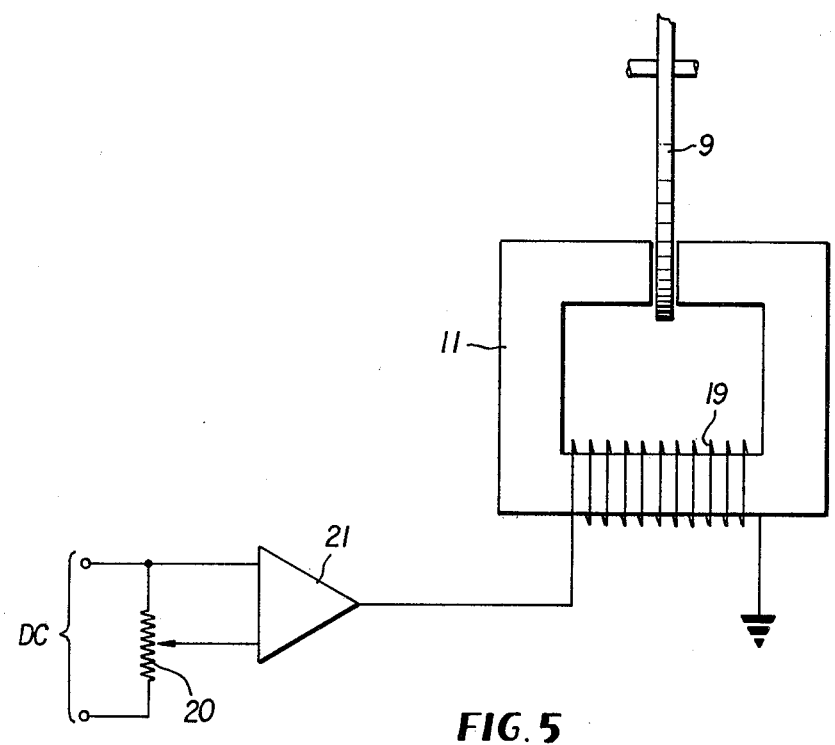
FIG. 5 illustrates a circuit using an electromagnet in accordance with the invention.

FIG. 4 illustrates the use of a magnetic shunt. Permanent magnet 11 is fixed in position and a magnetic shunt 18 integral with rotating axle 12 is configured to penetrate the gap in the magnet 11. When the delivery speed increases, the size of the loop increases, the arms 16 pivot in the direction of arrow a and the shunt 18 pivots in the direction of arrow f. Therefore, the shunt penetrates the gap of the magnet 11 and deflects part of the magnetic field. The result is that the magnitude of the magnetic field passing through the disc 9 decreases and the braking force decreases so that the speed of the motor increases. As with the above systems, this system will eventually reach an equilibrium position. FIG. 5 illustrates the use of an electromagnet in combination with the invention. The electromagnet 11 is an electromagnet with a winding 19. Potentiometer 20 controlled by the pivotal movement of arm 16 achieves variation of the excitation current, which is then applied to amplifier 21. When the size of the loop decreases, the voltage of the DC current increases, the magnitude of the magnetic field decreases and the speed of the motor increases.

What is claimed is:
1. An apparatus for regulating a driving means which controls the speed of a moving yarn such as a yarn which is being delivered and a yarn which is being drawn off, in accordance with a variation between the delivery and draw off speeds, said apparatus comprising:
 (a) a driving means including an asynchronous electric motor, providing a slip coupling by ensuring by itself a slippage, directly connected to a driving shaft, said slip coupling being non-adjustable during its operations;
 (b) an eddy current braking assembly comprising a braking element directly connected to the driving shaft and a means including a magnet for creating a variable magnetic field to be applied to said braking element;
 (c) loop means for forming a variable loop in said yarn the size of the loop being varied according to said variation between the delivery and draw-off speeds;
 (d) monitoring means for monitoring the size of the loop; and
 (e) means for interconnecting said monitoring means and said means for creating a variable magnetic field, said means for interconnecting causing said means for creating a variable magnetic field to increase or decrease the magnitude of the magnetic field as a function of the size of the loop, thereby applying a variable magnetic field to the braking element and varying the braking of the driving shaft, whereby the size of the loop reaches an equilibrium and the driving shaft is regulated to be at equilibrium with the delivery or draw off speed of the yarn.

2. The apparatus of claim 1 wherein the monitoring means is a movable mechanical member of which the displacement follows a variation in length of the loop, and wherein said magnet is a permanent magnet mechanically connected to the movable mechanical member such that the displacement of the movable mechanical member varies the position of the permanent magnet with respect to the braking element thereby varying the magnitude of the magnetic field through which the braking element passes.

3. The apparatus of claim 1 or 2 wherein the magnet further includes a magnetic shunt consisting of a metal piece adjacent the braking element, the metal piece deflecting and conducting a magnetic field, the magnitude of deflection depending on the size of the loop.

4. The apparatus of claim 3 wherein the braking element is a disc.

5. The apparatus of claim 2 wherein the braking element is a disc and wherein the displacement of the movable mechanical member varies the adjacent surface area between the disc and the permanent magnet.

6. The apparatus of claim 1 wherein the monitoring means is a movable mechanical element of which the displacement follows the variations in length of the loop and the magnet is an electromagnet further including a means for varying the current applied to the electromagnet as a function of the position of the movable mechanical element.

7. The apparatus of claim 2 wherein the monitoring means comprises an idler arm connected to an idler wheel around which said yarn passes to form a loop, said idler arm being pivotable about an axle, said axle being connected to the magnet for rotating the magnet away from and toward the disc.

8. The apparatus of claim 7 wherein said magnet is comprised of a U-shaped member forming a slot therein for receiving, at least in part, the disc.

9. The apparatus of claim 1, 2, 5 or 6 wherein the driving means drives the pilot roller of a winder, the pilot roller driving a take-up roll by friction.

10. The apparatus of claim 3 wherein the driving means drives the pilot roller of a winder, the pilot roller driving a take-up roll by friction.

11. The apparatus of claim 5 or 6 wherein the speed of the moving yarn may be controlled so that the yarns move at 6,000 meters/minute and above.

* * * * *